United States Patent
Hallock et al.

(10) Patent No.: US 12,494,074 B2
(45) Date of Patent: Dec. 9, 2025

(54) COPY PREVENTION OF DIGITAL SAMPLE IMAGES

(71) Applicant: EUROPEAN CENTRAL BANK, Frankfurt am Main (DE)

(72) Inventors: John Scott Hallock, Six Mile, SC (US); Pascal Bigare, Ottignies (BE); Sylvain Chosson, Zurich (CH); Claudio Bellini, Rome (IT); Martin Eichenberger, Zollikon (CH); Elisabeth Schulz, Frankfurt (DE)

(73) Assignee: EUROPEAN CENTRAL BANK, Frankfurt am Main (DE)

( * ) Notice: Subject to any disclaimer, the term of this patent is extended or adjusted under 35 U.S.C. 154(b) by 344 days.

(21) Appl. No.: 18/038,659

(22) PCT Filed: May 25, 2021

(86) PCT No.: PCT/EP2021/063914
§ 371 (c)(1),
(2) Date: May 24, 2023

(87) PCT Pub. No.: WO2022/111864
PCT Pub. Date: Jun. 2, 2022

(65) Prior Publication Data
US 2024/0112484 A1   Apr. 4, 2024

(30) Foreign Application Priority Data
Nov. 24, 2020 (EP) ..................... 20209547

(51) Int. Cl.
*G06V 30/19* (2022.01)
*G06F 18/2413* (2023.01)
(Continued)

(52) U.S. Cl.
CPC .... *G06V 30/19147* (2022.01); *G06F 18/2413* (2023.01); *G06F 21/6218* (2013.01);
(Continued)

(58) Field of Classification Search
CPC .... G06V 30/41; G06V 30/413; G06V 30/418; G06V 30/19147; G06V 10/82;
(Continued)

(56) References Cited

U.S. PATENT DOCUMENTS

| | | | |
|---|---|---|---|
| 5,619,620 A | 4/1997 | Eccles | G06E 1/00 |
| 5,845,008 A | 12/1998 | Katoh et al. | 382/217 |

(Continued)

FOREIGN PATENT DOCUMENTS

| | | | |
|---|---|---|---|
| JP | H07143334 | 6/1995 | H04N 1/40 |

OTHER PUBLICATIONS

International Search Report and Written Opinion issued in PCT/EP2021/063914, dated Aug. 12, 2021, 12 pages.
(Continued)

*Primary Examiner* — Daniel G Mariam
(74) *Attorney, Agent, or Firm* — HAYES SOLOWAY P.C.

(57) ABSTRACT

A computer-implemented method for training an artificial intelligence based neural network is provided. At least one digital image of at least one security document is provided as a reference. A set of digital training images is provided, wherein these are altered compared to the digital image of the security document. The set of digital training images includes a first subset of positive digital training images having a visual impact of an alteration such that an unbiased human observer would consider a reproduction of the respective digital training image to represent the security document or multiple security documents. The set of digital training images includes a second subset of negative digital training images. Ground truth is provided to the neural (Continued)

network as to whether a reproduction of the respective digital training image is to be considered representing the security document or multiple security documents or not.

28 Claims, 4 Drawing Sheets

(51) Int. Cl.
  *G06F 21/62* (2013.01)
  *G06V 10/82* (2022.01)
  *G06V 20/00* (2022.01)
  *G06V 30/413* (2022.01)
  *G06V 30/42* (2022.01)
(52) U.S. Cl.
  CPC .............. *G06V 10/82* (2022.01); *G06V 20/95* (2022.01); *G06V 30/19173* (2022.01); *G06V 30/413* (2022.01); *G06V 30/42* (2022.01)
(58) Field of Classification Search
  CPC ......... G06T 7/001; G06F 18/214; G07D 7/00; G07D 7/2008
  See application file for complete search history.

(56) References Cited

U.S. PATENT DOCUMENTS

| | | | |
|---|---|---|---|
| 6,449,377 B1 | 9/2002 | Rhoads | 382/100 |
| 2019/0197642 A1 | 6/2019 | Rodriguez et al. | G06Q 50/265 |
| 2019/0303666 A1* | 10/2019 | Summers | G06N 3/08 |
| 2022/0094709 A1* | 3/2022 | Sharma | G06F 18/2415 |

OTHER PUBLICATIONS

International Preliminary Report on Patentability issued in PCT/EP2021/063914, dated Feb. 2, 2023, 10 pages.
Garita Figueiredo Renato et al., "Combining Deep Learning and (Structural) Feature-Based Classification Methods for Copyright-Protected PDF Documents" Advances In Databases and Information Systems, [Lecture Notes in Computer Science], Sep. 9, 2019, Abstract Only, 11 pages.
He et al. "Deep Residual Learning for Image Recognition", https://arxiv.org/abs/1512.03385, Dec. 10, 2015, 12 pages.
Huang et al. "Densely connected convolutional networks.", https://arxiv.org/abs/1608.06993, Jan. 28, 2018, 9 pages.
"ImageNet Large Scale Visual Recognition Challenge 2014", https://image-net.org/challenges/LSVRC/2014/, 2020, 4 pages.
Jeblad, "Canonical form of residual neural nets", https://commons.wikimedia.org/wiki/File:ResNets.svy. Nov. 24, 2017, 4 pages.
Kingma et al. "Adam: A Method for Stochastic Optimization", https://arxiv.org/abs/1412.6980, Jan. 30, 2017, 15 pages.
Lin et al. "Microsoft COCO: Common Objects in Context", https://arxiv.org/abs/1405.0312, Feb. 21, 2025, 15 pages.
Pham Tuyen Danh et al., "Deep Learning-Based Fake-Banknote Detection for the Visually Impaired People Using Visible-Light Images Captured by Smartphone Cameras" IEEE Access, vol. 8, Mar. 30, 2020, 18 pages.
Russakovsky et al. "Imagenet large scale visual recognition challenge", https://arxiv.org/abs/1409.0575, Jan. 30, 2015, 43 pages.
Syuhada Nur et al., "Banknote Authentication using Artificial Neural Network" Malaysia Specia issue Sci.Int. (Lahore), Oct. 16, 2014, 1865-1868, https://core.uk/download/pdf/235651258.pdf, 4 pages.
Szegedy et al. "Rethinking the Inception Architecture for Computer Vision", https://arxiv.org/abs/1512.00567, Dec. 11, 2015, 10 pages.

\* cited by examiner

COPY PREVENTION OF DIGITAL SAMPLE IMAGES

BACKGROUND OF THE INVENTION

The present invention relates to a computer-implemented method for training an artificial intelligence based neural network applicable for classifying digital images to be considered as a security document or not without authenticating a security feature, a computer-implemented method for copy prevention of at least one security document, a banknote detector, and a computer program product.

Security-relevant documents such as flight tickets or banknotes are often subject to reproducing actions, for example counterfeiting actions. One measure to approach forged documents relates to the assessment of the authenticity of questionable documents. However, this approach is a downstream activity in the sense that the original document has been reproduced already at the time of performing the authentication process on the questionable document. Therefore, authentication-related measures are less desirable.

The reproduction of the original document can be performed by means of scanning devices, printers and/or copying devices. A reproduction can also be considered a data copying process such as a data transformation. In this regard, avoiding the reproducing action itself, in case a document when being reproduced could potentially be considered an original security document, is favorable. In this case the reproduction is avoided before even being performed. Such methods exist with regard to specialized security features included in the security documents. This means, for a given document in question it is evaluated whether this document comprises a security feature originally contained within the security document. However, these approaches are unfavorable for several reasons. Firstly, the evaluation with regard to security features is complex and requires sophisticated devices. Secondly, such an evaluation process would need to contain specific information on the security features. If counterfeiters would lay open the evaluation process they would gain this information. Thirdly, counterfeiters may attack security features and included amended features within the document in question which could lead to incorrect results of the evaluation method.

Various security features exist for the purpose of preventing the actions described above. They may be for example printed graphical design elements that are recognized by special detectors in the aforesaid devices. The detectors may then trigger a response, which interferes with the desired action, such as refusal to process, or printing a highly degraded image. Such graphical elements may be designed so as to have the appearance of being a part of the security document artwork. An example of the use of such elements may be found in U.S. Pat. No. 5,845,008. In other cases, special signals, which are visibly nearly imperceptible, may be added to the printed designs so that they are recognized by special detectors in the aforesaid devices, which may then trigger responses as described above. An example of the use of such elements may be found in U.S. Pat. No. 6,449,377.

These security features, however, suffer from inherent vulnerabilities. Graphical design elements, even when the attempt is made to make them look like part of the artwork, may often be readily recognized by skilled persons for their intended securing purpose. The result is that they may be altered just slightly enough so that the special detectors no longer identify them and thus fail to interrupt the reproducer's desired action. They may also be misused by applying said elements to other documents not intended to be protected by the legitimate users so that persons are unable to complete scanning, copying or printing actions on said documents.

Special signals such as digital watermarks can also have the undesirable trait of appearing to distort the printed document. In the case of banknote artwork, this can be especially undesirable. The distortion can be lessened, albeit at the expense of signal strength; usually a compromise is sought.

Artificial Intelligence in combination with machine learning is increasingly being used for applications like facial recognition and other object identification. In such applications, there are an infinite number of potential images, which may need to be robustly recognized. An application, for example, which is trained to recognize an image of a gray squirrel as such may encounter any one of a huge variation of gray squirrel sizes, poses, ages, color shades, lighting or any other of a number of individual characteristics. An application designed to reliably recognize an individual person's face will have to face similar variations, which at the very least adds to the computational complexity and computing resource needs of the application.

SUMMARY OF THE INVENTION

The objective technical problem to be solved can be considered to consist in providing a method for training an artificial intelligence based neural network applicable for classifying digital images to be considered as a security document or not without authenticating a security feature and a method for copy prevention of a security document making use of the so trained neural network which is improved compared to the prior art.

According to the present invention, the neural network is not trained to authenticate digital images, in particular digital images of security documents. Moreover, the inventive method for copy prevention of a security document is not replacing any authentication process. In contrast, the inventive method for copy prevention generally may represent an additional measure, which may be applied so as to evaluate whether a reproduction of a digital sample image could be perceived by an unbiased human observer as a security document.

The problem is solved by the subject matter of the independent claims. Preferred embodiments are indicated within the dependent claims and the following description, each of which, individually or in combination, may represent aspects of the invention. The advantages and preferred embodiments described with regard to the indicated devices are correspondingly to be transferred to the according methods and vice versa.

The present invention uses an inventively trained artificial intelligence based neural network in order to determine whether a digital image of a document may be copied/reproduced and, thus, does not make use of the presence of security features representing code for copy protection. Thus, documents which shall be copy prevented do not need to comprise a code for copy protection in order to specifically prevent reproducing a digital image. According to the present invention the design of the document to be copy protected does not need to be distorted by use of an additional code for copy protection, which also reduces a risk that counterfeiters identify an area of the code for protection. In addition, the absence of a code for copy protection on a document reduces a risk that such a code for copy prevention may be hacked or the code may be used illegally on other items for illegally stopping their reproduction. The inventive method for copy protection using an inventively trained artificial intelligence based neural network is particularly suitable for high throughput sorting and/or copying/reproduction solutions of security documents, in particular of banknotes. It may be performable on shorter time scales as it may require less time for determination whether a document shall be reproduced or not than common authentication methods of security documents, which require authentication of the specific code for copy protection.

According to a first aspect, a computer-implemented method for training an artificial intelligence based neural network is provided. The neural network is applicable for classifying digital images to be considered as a security document (in the following also indicated with A for reference purposes) or not. This means, the method may be configured to train the network for classifying a digital image to be considered as a security document A or for classifying a digital image such that it is not considered as a security document. The advantage of artificial intelligence based neural networks, in particular convolutional networks as deep learning models, results mainly from the interpretation of the whole, unprocessed image excluding normalization and standardization. The neural network then generally converts signals into a set of features on the basis of which classification takes place. The set of features differs between models due to their architecture and training process, but can generally be interpreted as condensed information about the content of an image.

The method comprises providing at least one digital image A1 of at least one security document as a reference.

The method also comprises providing a set of digital training images (in the following also indicated with B1 for reference purposes). Based on the digital training images the neural network may be trained with regard to the classification process. The digital training images are altered compared to the digital image of the security document.

The set of digital training images comprises a first subset of positive digital training images (in the following also indicated with B1-1 for reference purposes) having a visual impact of an alteration such that an unbiased human observer would consider a reproduction of the respective digital training image to represent the security document or multiple security documents.

The set of digital training images also comprises a second subset of negative digital training images (in the following also indicated with B1-2) having a visual impact of the alteration such that the unbiased human observer would not consider a reproduction of the respective digital training image to represent the security document or multiple security documents.

The method further comprises providing ground truth for each digital training image to the artificial intelligence based neural network. The ground truth represents at least one acceptance level of one or more unbiased human observers as to whether a reproduction of the respective digital training image is to be considered representing or not representing the security document or multiple security documents. In other words, the ground truth is used to train the neural network with regard to a decision process of the classification. The ground truth describes how the specific digital training images are to be interpreted in this training process. The at least one acceptance level comprises respectively one or more responses of the unbiased human observers regarding the determination whether a reproduction of a respective training image is considered to represent or not represent the security document. For example, in case of one unbiased human observer the acceptance level represents the respective response of this human observer. In case of two, three, four or more human observers, the responses of the two, three, four or more human observers are respectively used to represent the acceptance level.

The so designed method may advantageously train the artificial intelligence based neural network with regard to digital training images relative to at least one security document. Accordingly, the neural network may be trained for each digital training image as to which acceptance level a reproduction of the specific digital training image would be considered the security document by an unbiased human observer. Accordingly, the neural network may be trained a decision behavior when a reproduction of a digital image is to be considered the security document.

Within the context of all aspects of the present invention, the terms "can", "could", "may" or the like also include the indicative/realis mood of the correlated verb. For example, the expression "the data file can be suitable to describe the properties of the image means of the digital code" also includes the indicative/realis mood "the data file is suitable to describe the properties of the image means of the digital code".

Within the context of the present invention, the expressions "image(s) to be considered as a security document" or "digital image(s) to be considered as a security document" or "reproduction of an image to be considered as a security document" or "reproduction of a digital image to be considered as a security document" means that an unbiased human observer could (at least up to a certain acceptance level) perceive/regard/interpret a reproduction of the (digital) image as the security document. In other words, the unbiased human observer does neither authenticate the security document, its (digital) image nor its reproduction. Instead, the unbiased human observer upon viewing/observing or using the digital image considers/has the impression/imagines at least for a certain acceptance level that the (digital) image or its reproduction represents the security document or a specimen thereof. Therefore, the feature expression as indicated above, may also be regarded as to whether the unbiased human observer would accept the (digital) image or its reproduction as a specimen of the security feature without any underlying authentication process.

Within the context of the present invention, a digital image refers to a digital code usually written in a computer language and therefore being computer-readable code representing a specific image as a data file. The data file can be suitable to describe the properties of the image by means of the digital code.

The digital image of the security document can have a resolution within the range of 50 dpi to 2000 dpi, in particular within the range of 100 dpi to 1000 dpi, further in particular within the range of 200 dpi and 600 dpi, further in particular in the range of 300 dpi to 400 dpi.

Within the context of the present method, a reproduction of a digital image refers to a hard copying and/or printing process such that the digital image is physically processed to be permanently visible on printable media, at least for a certain amount of time such as several years. In addition, reproducing a digital image may also include a data processing, transforming or saving process with regard to the data underlying the respective digital image.

The digital training images may be altered compared to the reference. Within the context of the present invention, an altered digital training image may be considered a digital training image which has a different or reduced quality compared to the reference. Examples of image alterations/transformations may relate to ColorJitter augmentation, which may include the parameters brightness, contrast, saturation and/or hue; RandomAffine augmentation, which may include the parameters degrees, translate, scale, shear, interpolation and/or fill; GuassianBlur augmentation, which may include the parameters Kernel size and/or standard deviation.

Altered digital training images labelled as being perceivable as a security document may comprise the following alteration/transformation ranges compared to the reference security document: ColorJitter augmentation, which may include alterations in the parameters brightness (e.g., in the range of ±5%), contrast (e.g., in the range of ±8%), saturation (e.g., in the range of ±8%) and/or hue (e.g., in the range of ±6%); RandomAffine augmentation, which may include alterations in the parameters degrees (e.g., 0.05 deg), translate (e.g., between 0% and 1% of the image size horizontally or vertically), scale (e.g., increasing or decreasing the size by 1%), shear (e.g., shear parallel to the x-axis between −0.5 deg and +0.5 deg), interpolation (e.g., Nearest Neighbor Interpolation) and/or fill (white); GuassianBlur augmentation, which may include alterations in the parameters Kernel size (e.g., 5×5) and/or standard deviation (e.g., 0.3).

In turn, altered digital training images labelled as not being perceivable as a security may comprise the following alteration/transformation ranges compared to the reference security document: alterations in the parameters brightness (e.g., in the range of more than ±5%), contrast (e.g., in the range of more than ±8%), saturation (e.g., in the range of more than ±8%) and/or hue (e.g., in the range of more than ±6%); RandomAffine augmentation, which may include alterations in the parameters degrees (e.g., more than 0.05 deg), translate (e.g., more than 1% of the image size horizontally or vertically), scale (e.g., increasing or decreasing the size by more than 1%), shear (e.g., shear parallel to the x-axis between more than −0.5 deg and more than +0.5 deg).

In an alternative, the digital training image may from a viewpoint of reproduction, e.g. printing, have a similar quality, but may be doctored or modified so as to distinguish from the reference security document. Examples may be amendments/substitutions of design and/or text elements, different arrangements of design and/or text elements.

According to an example, the reference security document may, e.g., be specific banknote including a portrait of the British Queen. The digital training image may then have similar quality with regard to printing properties such as resolution, shape, dimensions, colors, etc. However, the portrait of the British Queen may be replaced by a different person, e.g. the British Prime Minister or any other related person so that an unbiased human observer would consider this document be represent a security document. Such altered digital training images may according to the present invention be regarded as an alteration, such that an unbiased human observer would consider a reproduction of the respective digital training image to represent the security document or multiple security documents. The alteration may include a degradation. According to an alternative embodiment, the portrait of the British Queen may be replaced by a portrait of the President of the United States of America or any unrelated person so that an unbiased human observer would directly understand that this document is not to be considered as a security document. In this case, the digital training image may still be regarded as altered or degraded, but the unbiased human observer would not consider a reproduction of the respective digital training image to represent the security document or multiple security documents.

The altered digital training images can be degraded. In this case, the digital training images can be based on training documents B, which have been chemically or physically attacked. This means that training documents may have been chemically or physically degraded. For example, a chemical reactive substance may have been applied or the training document may have been scratched. The digital training image may then be acquired after the underlying training document has been attacked. Accordingly, the digital training image may show modifications caused by the attack on the underlying training document.

In an alternative, a digital image may have been acquired based on a non-altered training document, but the digital image may have been digitally attacked itself. For example, the digital image may have been modified/augmented by applying a digital filter. Modifications/augmentations may include ColorJitter augmentation, which may include the parameters brightness, contrast, saturation and/or hue; RandomAffine augmentation, which may include the parameters degrees, translate, scale, shear, interpolation and/or fill; and GuassianBlur augmentation, which may include the parameters Kernel size and/or standard deviation. In this case, the digital training image may be the digitally attacked digital image.

The altered digital training images may differ from the digital image of the security document with regard to at least one of a pixilation, a resolution, a definition, a general aspect, a shape, a color, a color distribution, an image processing filter, and an aspect ratio. For example, the digital training image may have a resolution, meaning a pixel density per unit area, which is reduced compared to the resolution of the reference. Accordingly, the visual impact may be different. Still, when being reproduced the resolution of the digital training image may be sufficient such that the unbiased human observer would consider the reproduction to represent the security document. The general aspect refers to features of the digital image of the security document which are not equally included in the digital training document. For example, the security document may partially show a specific landscape including several mountains. The digital training image may show a different landscape having the same number of mountains or may show in principle the same landscape but may miss some of the mountains included in the security document. The aspect ratio refers to a general ratio of length to width of the security document and the digital training image. The definition refers to a total number of pixels of the respective item with regard to horizontal and vertical directions. The image processing filter may include a noise reduction filter, a blur filter, a so-called neural filter using AI to process images, and similar digital filters.

The altered digital training images may differ from the digital image of the security document with regard to at least one of a perspective angle, an underlying illumination, a coloration, a fold, or a crease. The perspective angle may refer to the angle at which the digital training image appears to have been acquired. For example, the security document may have a rectangular shape. Due to the perspective angle during the acquisition of the digital training image (or due to a respective digital attack), the digital training image may fail to have a rectangular shape. Moreover, certain features within the digital training image may be distorted given a specific perspective angle. The illumination may refer to a brightness distribution present in the digital training document which differs from the brightness distribution the security document shows when it is sufficiently illuminated in a top view. In a similar manner, the digital training image may differ from the security document according to a coloration, i.e. a specific color of at least a portion or, more generally, a color distribution across the digital training image. A fold or a crease may have been present in a training document based on which the digital training document is acquired. Accordingly, the fold or the crease will generally also be perceptible within the digital training image.

Furthermore, the security document may comprise one or more graphical design features, such as a portrait, e.g. of the British Queen, or an architectural image (bridge, building, etc.) or a graphical image of nature (plants or parts thereof, such as a leaf, (so called floral/botanical emblems or floral/botanical elements), or fauna/animals (so called wildlife emblems or wildlife elements), etc.). The altered digital training image may then differ from the digital image of the security document in that the digital training image may comprise at least one different design feature substituting the corresponding design feature of the security document, such as a different portrait of a different related or unrelated person, a different related or unrelated architectural image or a different related or unrelated image out of nature. In this regard, the digital training image may be considered being altered. The neural network may be trained accordingly in this regard, i.e. whether the unbiased human observer considers the respectively altered digital images as relating to a security document or not. According to one embodiment, the unbiased human observer may consider the altered image as relating to the security document in case the graphical design feature is substituted by a related graphical design feature, e.g. for the British Pound banknote the portrait of Queen Elisabeth may be substituted by the portrait of the British prime minister or a portrait of another member of the British royal family. According to another embodiment, the unbiased human observer may consider the altered image as relating to the security document in case the graphical design feature is substituted by an unrelated graphical design feature, e.g. for the British Pound banknote the portrait of Queen Elisabeth may be substituted by the portrait of the president of the United States of America or another country. According to the present invention, architectural images may be regarded as being related to each other in case they belong to the same category, e.g. bridges, buildings etc., or in case they belong to architectural images regarded to represent the same country (e.g., Tower Bridge, Westminster Bridge and/or Westminster Abbey, Big Ben representing Great Britain; or e.g. Eiffel Tower and Pont Neuf representing France). According to another embodiment of the present invention, graphical images of nature may be regarded as being related to each other in case they belong to the same category, e.g. plants or parts thereof, such as leaf, animal, etc., or in case they belong to graphical images of nature regarded to represent the same country (e.g. Kangaroo, Platypus and Koala representing Australia).

This means that the digital training images are generally not equal with the digital image of the security document. However, the differences may be small enough that a reproduction of the digital training image is still to be considered the security document. In other words, the neural network is advantageously trained to reflect the finding that also digital images differing from the digital image of the security document may be considered by an unbiased human observer to represent the security document when being reproduced, at least at a specific acceptance level. In this regard, the acceptance level may describe the misbelief of an unbiased human observer. Although considerable deviations between the digital training image and the security document may be present, the observer may still consider a reproduction of the digital training image to represent the security document. If the security document and the digital training image are directly compared to each other, such deviations may be easily recognizable. However, the perception and remembrance of humans is limited. For example, it is well-known that people often accept counterfeit banknotes that differ significantly in appearance from an authentic banknote. Accordingly, an unbiased human observer may at least up to a certain extent (the acceptance level) generally consider differing items to be same if the differences are not too strong. For example, a forged banknote may be considered by a human observer to represent an original banknote. The inventive neural network is trained to advantageously include these differences and the specifics as to the human perception and remembrance.

The acceptance level may be considered to describe a similarity metrics between the altered digital training images and the reference as to which degree these (a reproduction) are considered by a respective number of human observers to distinguish from each other.

The unbiased human observer does not need to be an expert in the field but is considered a person commonly using the security document.

The ground truth may represent acceptance levels of at least four unbiased human observers. In this case, the ground truth may comprise at least five different acceptance levels. Since different humans might differently judge as to whether a reproduction of the digital training image represents a security document, this uncertainty is included within the training process by increasing the number of the decisive unbiased human observers. Therefore, the ground truth advantageously includes an improved distribution with regard to the acceptance level. For example, if there are four unbiased human observers (labelers), these generally result in five different acceptance levels, wherein the distribution with regard to the acceptance level as to whether a reproduction is considered to represent the security document or multiples thereof or whether this is not the case may be one of: 4/0, 3/1, 2/2, 1/3, 0/4. In other words, in case four labelers label the digital training images, the training image may be labeled as being perceivable as security document in case at least one labeler (or at least 25% of the labelers) will label this image as security document. Alternatively, the training image may be labeled as being perceivable as security document in case at least two labelers (or at least 50% of the labelers) will label this image as security document.

Of course, a finer segmentation of the acceptance levels may optionally likewise be cross-related with the information extracted from an evaluated digital image and/or with the score determined based on the extracted information. Accordingly, the decision mechanism when classifying digital images performed by the neural network may be more sophisticated.

In general, training images classified as "first subset of positive digital training images (B1-1)" are respectively assigned a number 1 and training images classified as "second subset of negative digital training images (B1-2)" are respectively assigned a number 0. The deep learning model, thus, outputs a score, which is a continuous number between 0 and 1. This score represents the likelihood of a given image to be a certain class. Accordingly, the closer the output score relates to 1, the more likely is the digital image perceived as a security document. In turn, this means, the closer the score relates to 0, the more likely is the digital image not perceived as a security document. In general, the threshold between the two classes may be 0.5 or more.

This threshold value may also be correlated with the acceptance level. In case the acceptance level is low, e.g., in case less than 50% of the labelers classify a digital image into the first subset of positive digital training images, than the threshold level may be determined to be 0.5 or higher. In case the acceptance level is higher, i.e. 50% or more of the labelers classify the respective digital image into the first subset of positive digital training images, the threshold value of the output score may be determined to be lower than 0.5.

Alternatively or in addition, this threshold value can be adjusted based on the precision/recall requirements for each model. Thus, the threshold value may be at least 0.1 or more, 0.15 or more, 0.2 or more, 0.25 or more, 0.3 or more, 0.35 or more, 0.4 or more, 0.45 or more.

The security document may be a banknote. In this case, two digital images comprising a front side image and a reverse side image of the banknote may be provided as two references. Then, each positive digital training image may have a visual impact of the alteration such that the unbiased human observer would consider a reproduction of the respective digital training image to represent the front side image and/or the reverse side image of the security document or multiple security documents. Since the reverse side of a banknote is also printed and, in particular printed differently than the front side, the positive digital training images can in principle match one of both sides or a combination of both. In any case, such a digital training image is a positive digital training image since the unbiased human observer may consider a reproduction of the specific digital training image to represent the banknote, at least with regard to a single side thereof or various combinations. Therefore, both sides of the banknote have to be provided as a reference and the set of training images is accordingly adapted.

Within the context of all aspects of the present invention, artificial intelligence (AI) neural network refers to a software or hardware based technique which is configured to draw decisions, e.g. a computer implemented algorithm. The AI can also be configured to automatically exploit provided data with regard to the intended purpose and to automatically provide the user with the respective result.

As input data one or more digital images are used, preferably a batch of two or more digital images, in particular 8 or more, 16 or more, ore 32 or more digital images are used at once as input data for the neural network prediction models in order to output a prediction score between 0 and 1. Generally, the closer the predicted output score is to 1, the more likely is the respective digital image classified as being perceived as security document (positive) and vice versa, the closer the predicted output score is to 0, the more likely is the respective digital image classified as being not perceived as security document (negative). The threshold level may generally be 0.5 or more, but may be adjusted based on the precision and recall of the respective models and/or based on the acceptance level. Thus, the threshold may be e.g., 0.1 or more, 0.15 or more, 0.2 or more, 0.25 or more, 0.3 or more, 0.35 or more, 0.4 or more, or 0.45 or more.

The digital sample image may preferably be provided in a suitable image size or may be resized accordingly. Suitable images sizes are (64, 128), (129, 256), (192, 384), (256, 512), or (299, 299). Preferably, the images size is the size used for training the prediction model, preferably the image size may be (64, 128).

The method may be executed using a deep neural network having one or more neural layers. Each layer may exhibit independently from other layers a number of neurons. Each layer may have a branched or non-branched architectural structure. Accordingly, the neural network may be advanced such that the training mechanism may be performed with a higher degree of detail.

The artificial intelligence based neural network of all inventive aspects may comprise machine learning capabilities. Accordingly, the neural network may be configured to learn from the training mechanism and to generalize the determining process based on the provided digital training images.

The inventive neural network including machine learning capabilities can be configured to include multiple inputs to improve the process of drawing decisions. In other words, the network can be configured to recognize several similar inputs in order to improve the probability of the accuracy of drawing a decision compared to the accuracy drawing a decision based on a single input.

In summary, suitable architectures and datasets for image classification already available can be used for the present invention. As an example, the following prediction model architectures may be used due to their high performance on similar problems and their flexibility to adapt to different tasks using fine-tuning:

ResNet

The ResNet architecture (He et al. "Deep residual learning for image recognition", https://arxiv.org/abs/1512.03385) won the ILSVRC (Russakovsky et al. "Imagenet large scale visual recognition challenge", https://arxiv.org/abs/1409.0575) 2015 classification competition. At the time researchers found out that networks with more layers were potentially able to perform better on many problems. However, in practice it was hard to train these deeper architectures because the weights of the initial layers that were far away from the output, were hard to update (vanishing gradient problem). The ResNet152 with 152 layers was possible to be trained due to the introduction of the residual block.

The ResNet architecture works by adding skipping layers in addition to the regular connections between layers (Jeblad, "Canonical form of residual neural nets", https://commons.wikimedia.org/wiki/File:ResNets.svg). This increases the gradient during backpropagation since the output of a layer l−2 directly influences the next but one layer l without having to pass through the in-between next layer l−1 first. A gradient that would vanish with only regular connections has a large enough value if residual blocks are present.

There exist several variants of ResNet such as ResNeXt4 and Wide ResNet5. For the present application, the original ResNet architecture with 50 layers may be selected, as it may produce a good balance between training effort and prediction performance.

Inception v3

The first version of the Inception networks (Szegedy et al. "Rethinking the Inception Architecture for Computer Vision", https://arxiv.org/abs/1512.00567) (also known as GoogLeNet, Szegedy et al. "Going Deeper with Convolutions", https://arxiv.org/abs/1409.4842) introduced the inception modules that combine convolutions with different kernel sizes in order to use features of different scales. Furthermore, auxiliary classifiers (a small convolutional neural net) were added as regularizers between several layers. These helped the network to generalize better to unseen images. This architecture won the ILSVRC 2014 competition ("ImageNet Large Scale Visual Recognition Challenge 2014", https://image-net.org/challenges/LSVRC/2014/).

With the second version, greater computational efficiency was achieved by factoring larger convolutions into smaller ones. For example, a convolution using a 5×5 kernel, is split up into two convolutions using 3×3 kernels, thus reducing the number of parameters from 25 to 18.

Inception v3 incorporates the ideas of the previous versions and improves on them using further factorization and modifications to the auxiliary classifier.

DenseNet

DenseNet is the most recent architecture among the three models (Huang et al. "Densely connected convolutional networks.", https://arxiv.org/abs/1608.06993). It received the Best Paper Award at the CVPR10 conference in 2017 ("CVPR 2017", https://cvpr2017.thecvf.com/). It takes the ResNet idea of skipping single layers one-step further by using Dense Blocks. In every Dense Block, each layer receives inputs from all preceding layers. Features maps from all previous layers are concatenated and used as the input for the next layer. Hence, the last layer in the block has access to the whole collective information. In particular, a DenseNet with 100 or more, in particular 121 layers may be used for the present application. Pre-training It has been shown that the features a neural network learns by training on one dataset for a specific task can also be meaningful for a different task involving a different dataset. Especially the first layers of a network are known to learn more generalizable features. Based on these findings, it is common practice to take a network that was trained on a large dataset, such as ImageNet ("ImageNet Large Scale Visual Recognition Challenge 2014", https://image-net.org/challenges/LSVRC/2014/) or COCO (Lin et al. "Microsoft COCO: Common Objects in Context", https://arxiv.org/abs/1405.0312) and then fine-tune its weights on a second dataset of interest. This approach of using pre-trained weights has been shown to be effective even when the second dataset is quite small.

Accordingly, the inventive training method uses according to a preferred embodiment a pre-training on a general large image dataset, thereby initializing the weights of the models to a state that performs well on the respective image dataset, such as ImageNet or COCO, wherein ImageNet has become a standard to benchmark classification models.

Then, the respective prediction model architectures are fine-tuned by training on the dataset containing digital images of the first subset of training images considered to be perceived as security documents (positive training documents) and containing digital images of the second subset of training images considered to no be perceived as security documents, respectively banknotes.

The method of the first inventive aspect may be performed for a closed set of multiple security documents. Then, the artificial intelligence based neural network may be trained for every security document of the closed set of security documents. Accordingly, the closed set may comprise or consist of a specific number of security documents for which the neural network may be trained. That may be advantageous if the neural network shall be used for security documents of a specific type for which only a certain number of different elements exist. For example, the closed set of security documents can be determined by the different banknote denominations of a limited number of currency systems.

Data Processing

As already set out hereinbefore, the input data relates to a batch of one or more, preferably 8 or more, 16 or more, or 32 or more digital images, used at once in the prediction model. E.g., a batch comprising 32 digital images shows an advantageous performance, in particular in the above example models.

According to a preferred embodiment of the present training method and also copy prevention method, the digital images of the respective batches may be resized to a common size, e.g., (64, 128), (128, 256), (192, 384), (256, 512), (299, 299) in order to have an advantageous influence on the weights. In case a pre-raining with a general image data set has been conducted, the resizing preferably uses the mean standard deviation of the images dataset, such as ImageNet or COCO. In other words, in case the inventive training data is standardized similar to the pre-training image data asset, the pre-trained weights work well on inventive training data.

According to an additive or alternative embodiment of the present invention, the number of training images may be artificially increased using suitable augmentations, such as ColorJitter augmentation, which may include the parameters brightness, contrast, saturation and/or hue; RandomAffine augmentation, which may include the parameters degrees, translate, scale, shear, interpolation and/or fill; GuassianBlur augmentation, which may include the parameters Kernel size and/or standard deviation. More specifically, at training time, a small perturbation may be applied to part or all of the training images. The strength of these perturbations are randomly selected from a predefined range. This range is carefully defined to ensure that the perturbations are not too powerful to change the groundtruth, i.e. an image considered acceptable as a security document, in particular banknote, shall remain acceptable after applying the perturbation.

Augmented digital training images labelled as being perceivable as security document may, thus, comprise the following alteration/transformation ranges: ColorJitter augmentation, which may include alterations in the parameters brightness (e.g., in the range of ±5%), contrast (e.g., in the range of ±8%), saturation (e.g., in the range of ±8%) and/or hue (e.g., in the range of ±6%); RandomAffine augmentation, which may include alterations in the parameters degrees (e.g., 0.05 deg), translate (e.g., between 0% and 1% of the image size horizontally or vertically), scale (e.g., increasing or decreasing the size by 1%), shear (e.g., shear parallel to the x-axis between −0.5 deg and +0.5 deg), interpolation (e.g., Nearest Neighbor Interpolation) and/or fill (white); GuassianBlur augmentation, which may include alterations in the parameters Kernel size (e.g., 5×5) and/or standard deviation (e.g., 0.3). The aforementioned transforms may be applied using the torchvision framework.

According to the outcome of the present experiments (see example section), such an artificial augmentation does, however, not improve the training. Instead, the image augmentation may be used for model's evaluation.

Suitable learning rates may be used to train the prediction models, such as 0.005, 0.01, 0.05, or 0.1. In other words, the learning rate defines the step size used to optimize the model learning process. Thus, the lower the step size, the earlier the optimization of the model learning process is conducted and the better the overall performance, but the higher the overall computational load. According to the present experiment, a step size of 0.005 has shown the best performance.

Optimizer

Generally, training a neural network is an optimization problem. This optimization can generally be done via different optimizers, among which stochastic gradient descent is the most well-known. Optimizers usually iteratively update model weights by calculating the value of a loss function for a single batch, determining the gradient of this function, and then taking a step (defined by the learning rate) towards the direction that minimizes the loss. E.g., the Adam (Kingma et al. "Adam: A Method for Stochastic Optimization", https://arxiv.org/abs/1412.6980) optimizer may be used as a suitable optimizer for the inventive training method. It builds on top of stochastic gradient descent, and has individual learning rates for each parameter and adjusts these according to the training progress.

Hyper-Parameter Search

According to an additional or alternative preferred embodiment of the present invention, after having established a functioning model as a baseline, the model's performance may preferably be optimized. This can be done by trying out different parameter combinations during training.

Additionally or separately, the inventive training method may implement suitable text-based classifiers, such as digits, e.g. in case of banknotes denomination values; letters or words; and/or implement ensembling strategy & models, such as using ensemble of only image classifiers or image and text based classifiers. In particular using ensembles can perform better and may be more robust.

The inventive training method is generally evaluated using one or more of common metrics, such as accuracy, precision (also known as "positive predictive value"), recall (also known as "sensitivity"), F1 and Mathew's Correlation Coefficient (MCC).

The confusion matrix generally gives a holistic view of the model performance, as it describes the prediction quality of a classifier and indicates where correct and incorrect predictions happen by displaying the ground truth (target) positive and negative classified digital images vs. the predicted (model) positive and negative classified digital images and, thus, indicates the number of true positive (TP), false positive (FP), true negative (TN) and false negative (FN) classified digital images.

Each evaluation metric tries to summarize the confusion matrix with a single number.

The evaluation metric "accuracy" relates to the percentage of correct predictions. In other words: Accuracy=(TP+TN)/(TP+TN+FP+FN). For balanced classes, i.e. the positive and negative classes have the same number of digital images, accuracy provides a good measure of overall performance.

The evaluation metric "recall" relates to the percentage of the true positives can be predicted by the model. In other words: Recall=TP/(TP+FN).

The evaluation metric "precision" relates to the percentage of true positives when it predicts positives. In other words: Precision=TP/(TP+FP).

The evaluation metric "F1" relates to the combination of precision and recall in a single metric and is defined as the harmonic mean of precision and recall. In other words: F1=(2×Precision×Recall)/(Precision+Recall).

The evaluation metric "Matthews Correlation Coefficient (MCC)" provides a robust against class imbalances, wherein several desirable model characteristics are merged into one number. The value is between [−1, +1], where −1 is the worst and +1 is the best. In other words: MCC=[(TP×TN)−(FFP×FN)]/[(TP+FP)×(TP+FN)×(TN+FP)×(TN+FN)].

As set out in the example section below in more detail, the experimental training set up for classifying banknotes showed that the architecture of ResNet50 in combination with an input image size of (64, 128), a batch size of 32, a learning rate of 0.005 and standard transformations exhibited the best performance.

The inventively configured copy prevention method is advantageously improved with regard to secureness. Since the property of the digital images based on which the prediction of the classification of the digital images is conducted is not a priori determined, it is generally unknown to the public and, thus, also to potential counterfitters, based on which criterion the digital images are analyzed. Therefore, counterfeiters are unable to design digital images to circumvent copy prevention and/or to facilitate copy.

All features and embodiments disclosed with respect to the first aspect of the present invention are combinable alone or in (sub-)combination with any one of the second to fifth aspects of the present invention including each of the preferred embodiments thereof, provided the resulting combination of features is reasonable to a person skilled in the art.

According to a second aspect, a computer-implemented method for copy prevention of at least one security document A is provided.

The method may comprise providing a digital sample image C1. The method may also comprise applying an artificial intelligence based neural network for classifying the digital sample image into a first category or a second category. The neural network may be trained according to the herein before described method.

The digital sample image may be classified into the first category if the neural network determines that a reproduction of at least a portion of the digital sample image could be considered by the unbiased human observer to represent the at least one security document or multiple security documents. This prediction is relates to the threshold value of the output score of the prediction model. In case the threshold value is 0.5, digital sample images receiving a score of 0.5 or higher will be classified into the first category. Alternatively, in case the threshold value may be 0.1 or more, 0.15 or more, 0.2 or more, 0.25 or more, 0.3 or more, 0.35 or more, 0.4 or more, or 0.45 or more, the digital sample image will be classified into the first category if the score respectively is at least 0.1 or more, 0.15 or more, 0.2 or more, 0.25 or more, 0.3 or more, 0.35 or more, 0.4 or more, or 0.45 or more. To increase the likelihood that no document may be reproduced which may be considered perceivable as security document, in particular banknote, the threshold value may be decreased. The tradeoff, however, is, that in this case the number of digital images increase, which are generally less considered perceivable as security documents, in particular banknotes. To reduce the number of false copy preventions, the artificial intelligence detection can be used as a pre-filter so that only a fraction of the original digital images needs to be authenticated in a further step using suitable detectors to identify the copy prevention image security feature, such as Eurion constellation or OM RON rings. In other words, only this fraction of digital images classified into the first category in the first artificial intelligence detection (not using any authentication security features) are in a second step authenticated using the common image security features. In case the second authentication step identifies the copy prevention images security feature, the copying process is prevented. In case the second step authentication of image security features does not identify the respective image security feature, the copy process is not prevented. Thus, the preferred embodiment of combining the artificial intelligence detection as a pre-filter and then applying the copy prevention authentication only on the positive fraction of the first step facilitates reducing the fraction of copy prevention on those digital images, which do not comprise a copy prevention image security feature. At the same time, the overall authentication time is reduced, as the artificial intelligence detection is less time intensive than the subsequent authentication of the copy prevention image security feature. Additionally, the artificial intelligence pre-filter does not prevent reproduction of those documents illegally comprising a copy prevention image security feature, but not being considered as being perceivable as security documents.

In an alternative, the digital sample image may be classified into the second category if the neural network determines that for no portion of the digital sample image a reproduction could be considered by the unbiased human observer to represent the at least one security document or multiple security documents. This prediction also relates to the threshold value of the output score of the prediction model. In case the threshold value is 0.5, digital sample images receiving a score of less than 0.5 will be classified into the second category. Alternatively, in case the threshold value may be 0.1 or more, 0.15 or more, 0.2 or more, 0.25 or more, 0.3 or more, 0.35 or more, 0.4 or more, 0.45 or more, the digital sample image will be classified into the second category if the score respectively is less than 0.1, less than 0.15, less than 0.2, less than 0.25, less than 0.3, less than 0.35, less than 0.4, or less than 0.45.

Furthermore, the method may comprise preventing the digital sample image from being reproduced if the neural network classifies the digital sample image into the first category.

Within the context of the present application the digital sample image refers to a digital image of a sample document C. For example, there could be a sample document for which it is to be determined whether a reproduction should be prevented or be allowed. Obviously, if an unbiased human observer could consider any portion of the sample document to represent the security document, a reproduction is to be avoided. Then an effective measure is provided as to avoid a reproduction of candidates which could be potentially used inappropriately or illegally as an (original) security document.

Therefore, a digital image of the sample document could be acquired to achieve a digital sample image. This digital sample image may then be provided to the neural network. As the neural network may be trained according to the details described hereinbefore, it is aware of digital images of at least one security document as a reference. The neural network may then be enabled to determine whether a reproduction of the digital sample image could be considered by an unbiased human observer to represent the security document or multiples thereof. During this process, the neural network may consider differences between the digital sample image and the reference. Although these differences may be present, the network may determine, at least at a certain acceptance level, that a reproduction of at least a portion of the digital sample image may be considered by an unbiased human observer to represent the security document. If this condition is determined to be true, at least to a certain acceptance level, then the digital sample image may be classified into the first category. This means that the first category comprises or consists of digital sample images which potentially could be misused. Accordingly, for the digital sample images classified into the first category a reproduction could be prevented to prohibit incorrect use which may be achieved by the current method. Preventing a reproduction may include preventing a processing of the digital sample image such that no hard-copy of the digital sample image can be acquired. Additionally or alternatively, the preventing measure can also include that the data underlying the digital sample image are prevented from being processed, transformed or saved.

Within the context of the present method, the security document can be one of a banknote, a check, a bill, a ticket, a passport, or a flight ticket. For these document types an unauthorized reproduction of a respective digital image holds significant risks for both, economical and security-related reasons. These risks are avoided or at least reduced by means of the method for copy prevention as herein described before.

Preventing the digital sample image to be reproduced if the inventively trained neural network classifies the digital sample image into the first category may include the activation of prohibiting means. The prohibiting means can be a software or hardware implemented structure. The prohibiting means may be configured to forbid a reproducing means such as a printer or a copying machine to reproduce the digital sample image. The prohibiting means may also be configured to prevent a data saving or data transforming process. This can be achieved by a master-/slave-system, wherein the prohibiting means may have control over the data processing unit included in such devices or in common data handling systems. Additionally or alternatively, the data representing the digital sample image may be amended by the prohibiting means such that they are not readable or are unable to be processed by the reproducing device, i.e. the printer or copying machine. Amending the data can comprise amending the data to include a mark/an attribute/a flag, wherein the mark/attribute/flag prevents the data from being reproduced.

The digital sample image may be altered compared to the digital image of the security document. The digital sample image may in particular be degraded compared to the digital image of the security document. The altered digital sample image may differ from the digital image of the security document with regard to at least one of a perspective angle, an underlying illumination, a coloration, a fold, or a crease. The specifics explained with regard to alteration (synonymous: degradation or modification) described herein within the context of digital training images may similarly apply to altered digital sample images. Similar, as in case of the altered digital training images, a digital sample image may not be at optimum due to various reasons, in particular due to degradation. Moreover, the image acquisition may not be optimized due to limitations of the illumination or due to a non-optimized arrangement of the image acquisition means. In addition, the sample document itself may differ from the security document, for example due to circulation or exchange of features, in particular graphical design features. Accordingly, such differences may be present in the digital sample image itself. However, as the neural network is trained accordingly, it may still be enabled to determine whether a reproduction of the digital sample image would be considered by an unbiased human observer as being related to a security document or not. In other words, since the neural network may have been trained using the digital training images which are altered compared to the reference, the neural network may make up for the differences being present between the altered digital sample image and the reference. The neural network may be configured to access the differences between the altered digital sample image and the reference appropriately, such that it is adapted to evaluate as to how an unbiased human observer would consider a reproduction of at least a portion of the digital sample image in view of the reference.

The security document may comprise a front side and a reverse side. Then, the digital sample image may be classified into the first category if the neural network determines that a reproduction of at least a portion of the digital sample image could be considered by the unbiased human observer to represent the front side and/or the reverse side of the security document or multiple security documents. In an alternative, the digital sample image may then be classified into the second category if the neural network determines that for no portion of the digital sample image a reproduction could be considered by the unbiased human observer to represent the front side and/or the reverse side of the security document or multiple security documents.

The ground truth provided in the method for training the neural network may represent a range of acceptance levels comprising or consisting of a first subrange and a second subrange. Then, the method for copy prevention could be modified insofar that a digital sample image may be classified into the first category if the neural network determines an acceptance level according to the first subrange that the reproduction of at least a portion of the digital sample image could be considered by the unbiased human observer to represent the at least one security document or multiple security documents.

In an alternative, the digital sample image could be classified into the second category if the neural network determines an acceptance level according to the second subrange that for no portion of the digital sample image a reproduction could be considered by the unbiased human observer to represent the at least one security document or multiple security documents. In this scenario, the first subrange may be larger than the second subrange.

The determined acceptance level may be cross-related with the threshold value of the output score, i.e. the higher the threshold value in number, the lower the acceptance level in number and vice versa.

The acceptance level may be considered to describe a similarity metrics between the altered digital sample images and the reference as to which degree these (a reproduction) are considered by a respective number of human observers to distinguish from each other.

This means that the neural network may be trained such that it may determine multiple different acceptance levels as to whether a reproduction of the digital sample image is considered by an unbiased human observer to present the security document. Advantageously, the range of acceptance levels is asymmetrically distributed with regard to the classifying mechanism of the digital sample image. In other words, only if the acceptance level is very low, the digital sample image may be classified into the second category for which a reproduction is not necessarily prevented. According to the larger subrange of acceptance levels, the digital sample image may instead be classified into the first category so that a reproduction is prevented. In other words, in case the first subrange is larger than the second subrange, there may be an asymmetry between the number of digital sample images classified into the first category and into the second category, at least when assuming a homogeneous distribution of the digital sample images with regard to the different acceptance levels.

In a simple scenario, an unbiased human observer could consider a reproduction of the digital sample image to represent the security document at a 50% acceptance level ranging from 0 to 1. Presuming that the first subrange is larger than the second subrange, this digital sample image, due to the 50% acceptance level, will be classified into the first category. The threshold between the subranges can in particular be determined to be very low, e.g. 0.3 vs. 0.7 for a range of 0 to 1, further 0.2 vs. 0.8 for a range of 0 to 1, e.g. 0.1 vs. 0.9 for a range of 0 to 1, furthermore e.g. 0.01 vs. 0.99 for the same range of the acceptance levels.

The asymmetric distribution with regard to classifying the digital sample image into the first category or the second category depending on the determined acceptance level may also lead to an asymmetry of the rate between false-positive events compared to the false-negative events. The number of false-positives may be larger, in particular much larger, than the number of false-negatives. Here, false-positive refers to a configuration according to which the neural network determines that a reproduction of at least a portion of the digital sample image would be considered by the unbiased human observer to represent the security document although the observer would actually consider the reproduction to not represent the security document. False-negative may refer to a configuration according to which the neural network determines that the unbiased human observer would not consider the reproduction of at least a portion of the digital sample image to represent the security document although the unbiased human observer would actually indeed consider the reproduction of at least a portion of the digital sample image to represent a security document The reason behind the asymmetry between false-positives and false-negatives may be given by the threshold with regard to the acceptance level between the first and the second subrange. If the threshold acceptance level between those subranges is low, a digital sample image is rather classified into the first category while it is classified into the second category only in rare cases. Therefore, the number of false-negatives will be smaller, in particular much smaller, than the number of false-positives.

The specific sizes of the first and second subranges with regard to the acceptance level may be a result of the training process applied on the neural network.

In an alternative, the neural network may be trained such that the first and second subranges would in principle be of the same size with regard to the overall range of acceptance levels. In this case, the asymmetry may be introduced manually by setting a respective threshold acceptance level before or during the usage of the neural network for copy prevention of a security document. The setting or the adaption of the threshold acceptance level may be for example motivated by the classification of digital sample images. If the second category comprises or consists of digital sample images for which a reproduction should be prevented, the threshold acceptance level may be adapted accordingly.

In another alternative, the threshold acceptance level may be adapted by the neural network itself based on its intrinsic machine learning capabilities.

The method for copy prevention of at least one security document can be based on a code, wherein the respective code of the method can have a binary size between 100 kB and 50 MB, in particular between 200 kB and 10 MB, further in particular between 500 kB and 1 MB. Since the code has a comparable small size the code can advantageously be implemented also in non-high end data processing devices such as a scanning device, a printer, a copying device etc.

The method for copy prevention of at least one security document can be configured to be executable within a period of time less than 60 sec, in particular within a period of time between 100 msec and 30 sec, in particular within a period of time between a time period less than 1 sec. The so configured method can advantageously be applied also during regular data processing procedures in real-time, such as a print of a digital image with acceptable expenditure of time.

In particular, the method for copy prevention may be executable at a speed that substantially does not slow down the reproduction process, e.g. a printing process. In this case, the processing of the method according to the second aspect of the present invention could take place within the mechanical latency of the printing device. For example, when using a printer, e.g. an inkjet printer, according to one embodiment this could mean that only a few lines of the digital image may be reproduced/printed before the reproduction/printing operation is stopped due to copy prevention. Still, this embodiment nonetheless achieves the purpose of the invention. All features and embodiments disclosed with respect to the second aspect of the present invention are combinable alone or in (sub-)combination with any one of the first or third to fourth aspects of the present invention including each of the preferred embodiments thereof, provided the resulting combination of features is reasonable to a person skilled in the art.

According to a third aspect of the present invention a banknote detector comprising or consisting of a communicating means and a data processing unit is provided. The communicating means may be configured to receive a digital sample image and to provide the digital sample image to the data processing unit. The data processing unit may be configured for carrying out the method for copy prevention of at least one security document. The banknote detector may be configured to prevent a reproduction of the digital sample image.

The inventive banknote detector may in particular be implemented in devices for reproduction of a sample document such as a copying machine or a printer. Accordingly, the banknote detector may be enabled to advantageously prevent the reproduction process of a sample document or a digital sample image if the digital sample image is classified into the first category as explained herein before.

The inventive banknote detector may be software-implemented. The banknote detector may be comprised within a device for reproducing the digital sample image. In an alternative, the banknote detector may be configured as a cloud-based or server-based application.

According to an alternative, the banknote detector may at least partially be hardware-implemented. In this case, at least some of the features of the banknote detector may be implemented by hardware-based data processing components, such as a CPU or a network communication device coupled with a CPU. Even the neural network may at least partially be implemented hardware-based, such as using quantum computing devices. In an alternative, the neural network may be software-implemented, e.g. by processor commands to be executed by the CPU.

The inventive banknote detector may be entirely realized as a digital code and written in a computer language. Accordingly, the banknote detector could easily be embedded in a firmware of reproducing devices, in particular in copying machines or printers. Moreover, updates on the banknote detector may then simply be achieved by providing upgraded firmware versions of such devices. In an alternative, such devices may comprise only a client portion of the banknote detector, whereas the banknote detector itself is comprised within a cloud service or a server. The client portion may then be configured to communicate with the cloud or the server to run the banknote detector within the cloud or on the server with regard to local digital sample images present at the client. It may be necessary to transfer the data relating to the digital sample image to the cloud or the server in this case.

The inventive banknote detector may be further configured to evaluate the digital sample image with regard to authenticity if the digital sample image is classified into the first category. The digital sample image may be evaluated with regard to at least one security feature, i.e. an image security feature for copy prevention, included in the at least one security document. In particular, specific copy prevention security features may be used in this regard, such as the so-called Eurion constellation, also called Omron rings. This embodiment, is advantageous, as it allows to further verify whether the digital image classified into the first category, i.e. considered to represent a security document, in fact represents the security document for which copying shall be prevented. In other words, such a preferred inventive embodiment provides a cross-check whether the digital images classified into the first category are "true" positive security documents and, thus, prevents misuse of any image security features which would be illegally applied to any non-security documents. In view that the authentication process is generally more time consuming in comparison to the pre-filter AI detection process, the preferred embodiment not only allows to cross-check true positive hits, but also provides overall time savings, as the authentication process of the image security features only needs to be conducted on the subset of digital images classified into the first category.

Since the inventive method for copy prevention does not rely (only) on the specific copy prevention security features (Eurion constellation), the artificial intelligence neural network also differs from known mechanism implemented in printers and copying machines. These require such specific copy prevention security features to be present on the sample document. However, the usability of the inventive method for copy prevention is much wider since, firstly, the method does not rely on true physical sample documents but on digital sample images instead, and, secondly, these digital sample images may be classified on a much wider range of visual characteristics included in the respective digital sample image.

In contrast thereto, the method for training an artificial intelligence based neural network of the first aspect of the present invention as well as the method for copy prevention of at least one security document according to the second aspect of the present invention do not depend on any security features included within the security document and, thus, do not authenticate the security document. Consequently, misuse or alteration of the specific security features, in particular image security features for copy prevention does not affect the inventive method for copy prevention. As set out previously, the present invention compared to a common authentication method has the advantage that the classification whether a document shall be further processed, in particular copied, printed, or otherwise reproduced, or not can be conducted quicker than conducting the full authentication steps for the code of copy prevention. Thus, the quicker neural network based method can first be applied to evaluate whether a reproduction of a digital sample image is generally considered to be perceivable a security document or not.

The sequential application of the artificial intelligence method of evaluating whether a reproduction of a digital sample image is generally considered to be perceivable as a security document or not in combination with a subsequentially applied authentication method for a respective security feature, namely an image security feature for preventing copying, which is conducted only on those documents, which in the first artificial method step were classified to represent a security document, then provides an overall time reduction.

During the first step of the artificial intelligence method of evaluating whether a reproduction of a digital sample image is generally considered to be perceivable as a security document or not, generally the majority of the investigated digital sample images may be classified the second category as a human observer would not consider a reproduction of any portion of the digital sample image a security document. According to the preferred inventive method, for this majority the authentication method does not even need to be performed, as in the first step the inventive copy prevention method already has been ruled out that these documents are generally perceivable as security documents. Accordingly, the sequential application of the processes may provide time savings compared to the case that full authentication of the entire set of digital sample images is performed.

Furthermore, the document design is not distorted by the use of a code for copy protection and also the risk of hacking an illegal application of the code for copy protection is reduced. In principle, the evaluation with regard to the digital sample images is independent from such security features/codes of copy protection. Thus, if a digital sample image is classified into the first category, reproduction is to be prevented.

Time savings may also be realized according to an additional aspect if security features or properties of the underlying security documents are misused on documents not intended to be so marked. Usage of security features or properties of security documents may be restricted to licensed authorities. If the features or properties are used in an illegal manner on or with documents not intended for use as security documents, the inventive method would in the first step evaluate with the AI detection method as a pre-filter whether the digital image of this document comprising the illegally applied image security feature for copy prevention is to be categorized into the first category (perceivable as a security document) or into the second category (not perceivable as a security document). For those cases, where the digital image is categorized into the second category, the inventive method would not apply the subsequent authentication process and, thus, the illegally applied image security feature for copy prevention cannot stop the reproduction process. Only for those digital images, which may be perceivable as security documents (categorized into first category) the subsequent authentication process for the image security feature for copy prevention would be applied and would lead to a prevention of the reproduction process. This, however, is advantageous, as an unbiased human may consider a digital reproduction of this digital image to represent a security document. Thus, only for such misuse cases categorized into first category, the time consuming authentication process may be conducted and for the misuse cases categorized second category the time consuming authentication process may be entirely avoided.

In order to provide a more sophisticated evaluation of the document including authentication, the banknote detector may further comprise authentication means in order to evaluate one or more security features including a code for copy protection and may be configured to determine the authenticity of the digital sample image compared to the reference in order to identify digital images which are based on counterfeit documents. For example, as additional authentication measure, the banknote detector could be configured to evaluate the digital sample image with regard to one or more codes for copy protection, e.g., the so-called Eurion constellation, also called Omron rings. In case the additional authentication step would result in the determination that the document does not carry one or more codes for copy prevention, the further processing may still be stopped and the document may additionally be classified as a counterfeit document. In this case, the combination of the inventive copy prevention method in addition to the authentication method of the codes for copy protection provides a further advantage in case the code for copy protection, e.g. Eurion constellation, would be illegally hacked and illegally applied to non-security documents. According to prior art copy prevention method, the codes of copy protection illegally applied to the document would be authenticated and the copy operation would be stopped, regardless of the nature of the document, i.e. regardless whether an unbiased human observer would consider the (digital) image of the document or its reproduction as a security document. In contrast thereto, the copy prevention method of the second inventive aspect requires the categorization of the digital image into the first category, which means that at least to a certain acceptance level the image or its reproduction could be regarded by an unbiased human observer as a security document, or into the second category, which means that the image or its reproduction at least to a certain acceptance level could not be regarded by an unbiased human observer as a security document. In case the digital image would fall in the second category, the copy prevention may not take place, even if the Eurion constellation would be authenticated with the additional authentication method. Accordingly, an illegally applied code of copy protection does not allow illegal copy protection.

Another advantage of combining the copy prevention method of the second inventive aspect with the prior art authentication method results in a copy prevention in case the (digital) image of counterfeit document does not carry codes of copy prevention—and, thus, the reproduction would not be stopped by the prior art authentication method, in case it could be considered by an unbiased human observer as a security document.

The method for training an artificial intelligence based neural network according to the first aspect of the present invention as well as the method for copy prevention of at least one security document according to the second aspect of the present invention, thus may be applied sequentially or simultaneously with a method of evaluating the authenticity of at least one security feature in order to identify digital images which are based on counterfeit documents so as to prevent a reproduction of those images. In case of a sequential application, the authentication method is applied subsequent to the inventive copy protection method based on the application of the artificial intelligence based neural network.

The banknote detector can comprise a lower ARM-type multicore CPU or similar CPU commonly used in mobile devices. The device can further comprise a main memory within the range of 4 MB to 8 GB, further in particular within the range of 16 MB to 2 GB, further in particular within the range of 64 MB to 512 MB, further in particular within the range of 128 MB to 256 MB. The method for copy prevention of at least one security document can be configured to be executable on the indicated CPU types in a local or remote fashion using a main memory of the indicated size.

All features and embodiments disclosed with respect to the third aspect of the present invention are combinable alone or in (sub-)combination with any one of the first, second and fourth aspects of the present invention including each of the preferred embodiments thereof, provided the resulting combination of features is reasonable to a person skilled in the art.

According to a fourth aspect, a computer program product comprising or consisting of instructions which, when the program is executed by a data processing unit, cause the data processing unit to apply an artificial intelligence based neural network for classifying the digital sample image into a first category or a second category. In this case, the neural network may be trained according to the herein before described method and the classification process may be achieved as also described herein before.

The computer program product can be stored encrypted and/or error-coded. Several of the underlying techniques and instructions should be kept secret for security reasons. Accordingly, if the code is stored encrypted the underlying techniques and instructions can advantageously be prevented from being made public.

In an alternative, the computer program product can be open-access. Generally, this does not hold any risks since the program cannot really be exploited in the same way as e.g. a digital watermark detector could be. In case of the digital watermark, when the code is exploited, a counterfeiter could be allowed to reconstruct the digital watermark signal and thus apply it to unauthorized images. However, in case of the method for copy prevention according to the second inventive aspect, a reproduction of at least a portion of a digital sample image is either be considered by the unbiased human observer to represent the security document or not. Hence, exploiting the present computer program product does not hold similar risks.

All features and embodiments disclosed with respect to the fourth aspect of the present invention are combinable alone or in (sub-)combination with any one of the first to third aspects of the present invention including each of the preferred embodiments thereof, provided the resulting combination of features is reasonable to a person skilled in the art.

BRIEF DESCRIPTION OF THE DRAWINGS

Further aspects and characteristics of the invention will ensue from the following description of preferred embodiments of the invention with reference to the accompanying drawings, wherein.

DETAILED DESCRIPTION OF THE INVENTION

All of the features disclosed hereinafter with respect to the example embodiments and/or the accompanying figures can alone or in any sub-combination be combined with features of the aspects of the present invention including features of preferred embodiments thereof, provided the resulting feature combination is reasonable to a person skilled in the art.

Figure 1:
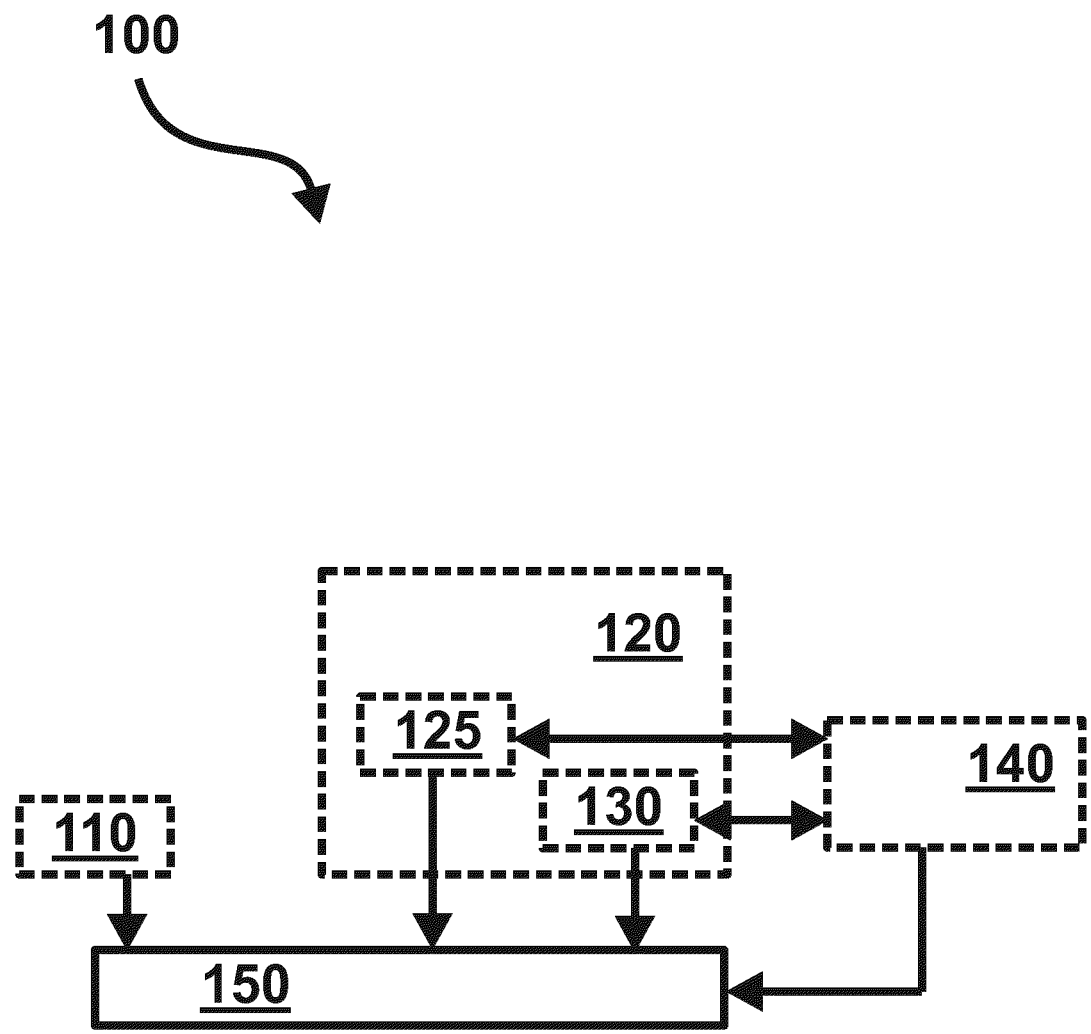
FIG. 1 shows a simplified schematic drawing of a method for training an artificial intelligence based neural network applicable for classifying digital images to be considered as a security document or not.

FIG. 1 shows a simplified schematic drawing of a method 100 for training an artificial intelligence based neural network 150. The method 100 is described herein below with reference to the device-type neural network 150 for illustrative purposes. However, this should not be construed as limiting the method 100.

The neural network 150 may be applicable for classifying digital images to be considered as a security document 110 or not. The neural network 100 may be a deep neural network having multiple layers. Within this method 100, the neural network 150 is trained based on three inputs. The neural network 150 may be a residual neural network (ResNet) additionally utilizing skip connections or shortcuts over one or more layers. A residual neural network having 50 layers has been used with respect to the present invention as set out in the example section. Alternatively, the neural network 150 may utilize inception networks that combine convolutions with different kernel sizes in order to use features of different scales. Inception v3 has been used as set out in the example section. Alternatively, the neural network 150 may utilize a Dense Net architecture, wherein each layer of the Dense Blocks receives inputs from all preceding layers so that feature maps from all previous layers are concatenated and used as the input for the next layer. In this case, the last layer of the Dense Block has access to the whole collective information. As set out in the example section, a DenseNet having 121 layers has been used.

Firstly, a digital image of a security document 110 is provided as a reference to the neural network 150. Accordingly, the security document 110 represents the reference for the digital images to be classified so as to be considered as a security document 110 or not.

Secondly, a set of digital training images 120 is provided to the neural network 150. The digital training images 120 may generally differ from the digital image of the security document 110. In particular, the digital training images 120 may be altered with respect to the digital image of the security document 110. The alteration of the digital training images 120 may be with regard to at least one aspect as described herein above.

In a particular example, the alteration may comprise a degradation which may be based on that the digital training images may at least partially comprise one of worn ink, small holes, heat damage up to a certain percentage of the surface, additional graffiti, stains, marks, tape, staples, or tears.

The set of training images 120 comprises or consists of a first subset of positive digital training images 125 and a second subset of negative digital training images 130. In this regard, a positive digital training image 125 may have a visual impact of an alteration such that an unbiased human observer would consider a reproduction of the respective digital training image 125 to represent the security document 110 or multiple security documents 110. A negative digital training image 130 may have a visual impact of an alteration such that an unbiased human observer would not consider a reproduction of the respective digital training image 130 to represent the security document 110 or multiple thereof.

The digital images may be provided exhibiting the same image size. Preferably, in case a pre-training with general image data has been conducted, the image size may be standardized to the image size used with the general image data so that the pre-trained weighs further work. The image size may be one of (64, 128), (128, 256), (192, 384), (256, 512), or (299, 299), preferably (64, 128).

For training purposes, a suitable amount of digital images are processed at once, such as 8 or more, 16 or more, 32 or more digital images are processed at once. Taking into account the computational load as tradeoff, a batch containing 32 digital images has been proven to show good performances.

The learning rate may be suitable chosen. In particular using a learning rate having a step size of one of 0.005, 0.01, 0.05 or 0.1. Taking into account the computational load as tradeoff, the step size for learning rate may be 0.005.

The model learning process may be optimized as set out hereinbefore. This optimization can generally be done via different optimizers, among which stochastic gradient descent is the most well-known. Optimizers usually iteratively update model weights by calculating the value of a loss function for a single batch, determining the gradient of this function, and then taking a step (defined by the learning rate) towards the direction that minimizes the loss. E.g., the Adam (Kingma et al. "Adam: A Method for Stochastic Optimization", https://arxiv.org/abs/1412.6980) optimizer may be used as a suitable optimizer for the inventive training method. It builds on top of stochastic gradient descent, and has individual learning rates for each parameter and adjusts these according to the training progress.

According to an additional or alternative preferred embodiment of the present invention, after having established a functioning model as a baseline, the model's performance may preferably be optimized. This can be done by trying out different parameter combinations during training.

Additionally or separately, the inventive training method may implement suitable text-based classifiers, such as digits, e.g. in case of banknotes denomination values; letters or words; and/or implement ensembling strategy & models, such as using ensemble of only image classifiers or image and text based classifiers. In particular using ensembles can perform better and may be more robust.

A reproduction may in particular be considered as a hard-copy-type multiplication, for example by means of a printer or a copying machine, or as a data transforming, saving, or processing action.

Naturally it is equally of interest whether an image which is desired to be reproduced represents a single security document or multiples thereof. Both events need to be considered.

The unbiased human observer was explained herein before.

Thirdly, ground truth 140 is provided to the neural network 150. The ground truth 140 represents at least one acceptance level of one or more unbiased human observers as to whether a reproduction of a respective digital training image 120 for each positive digital training image 125 and each negative digital training image 130 is to be considered by the neural network 150 to represent the security document 110 or multiples thereof. In other words, a digital training image 120 is classified into the first subset of positive digital training images 125 or the second subset of negative digital training images 130 using one or more, in the present case four labelers per digital image. The digital images is to be classified if at least one of the labelers, in the present case two labelers classify the digital training image either into the first positive subset 125 or the second negative subset 130.

The acceptance level may be considered to quantize how an unbiased human observer would interpret a reproduction of the digital training image 120 in relation to the security document 110.

Based on the method 100, the neural network 150 may be trained a decision behavior as to whether the reproduction of the provided digital training images 120 is to be considered as a security document 110 or not. This decision behavior is based on the acceptance level of the at least one unbiased human observer. Accordingly, a predicted output score is assigned to the digital images with shows the likelihood that the respective digital images may be considered as perceivable as a security document, in particular a banknote. The score is normalized to the range between 0 and 1. The closer the score is to 1, the more likely is the digital image considered perceivable as a security document. The closer the score is to 0, the less likely is the digital image considered perceivable as a security document. A threshold value output score may be predetermined so that a digital image with a predicted output score representing the threshold value or higher is considered to be perceivable as a security document. Vice versa, a digital image with a predicted output score representing less than the threshold value is considered to not be perceivable as a security document. The threshold value may be determined in correlation with the acceptance level. In other words, in case the acceptance level is low, i.e. less than 50% of labelers classify the digital image into the first positive subset, than the threshold value may be 0.5 or higher. In turn, in case, the acceptance level is high, i.e. more than 50% of labelers classify the digital image into the first positive subset, than the threshold value may be less than 0.5.

Within the method 100, the security document 100 and the set of digital training images 120 may each be closed sets. For example, for a given series of security documents, e.g. EURO-banknotes, the set of digital training images 120 may comprise or consist of different positive and negative digital training images 125, 130, respectively. In a further example, security documents 110 as a reference and digital training images 120 may be provided for different denominations of different currencies.

Exemplarily, the set of digital training images 120 may comprise several hundreds or thousands of each, the positive digital training images 125 and the negative digital training images 130.

Figure 2:
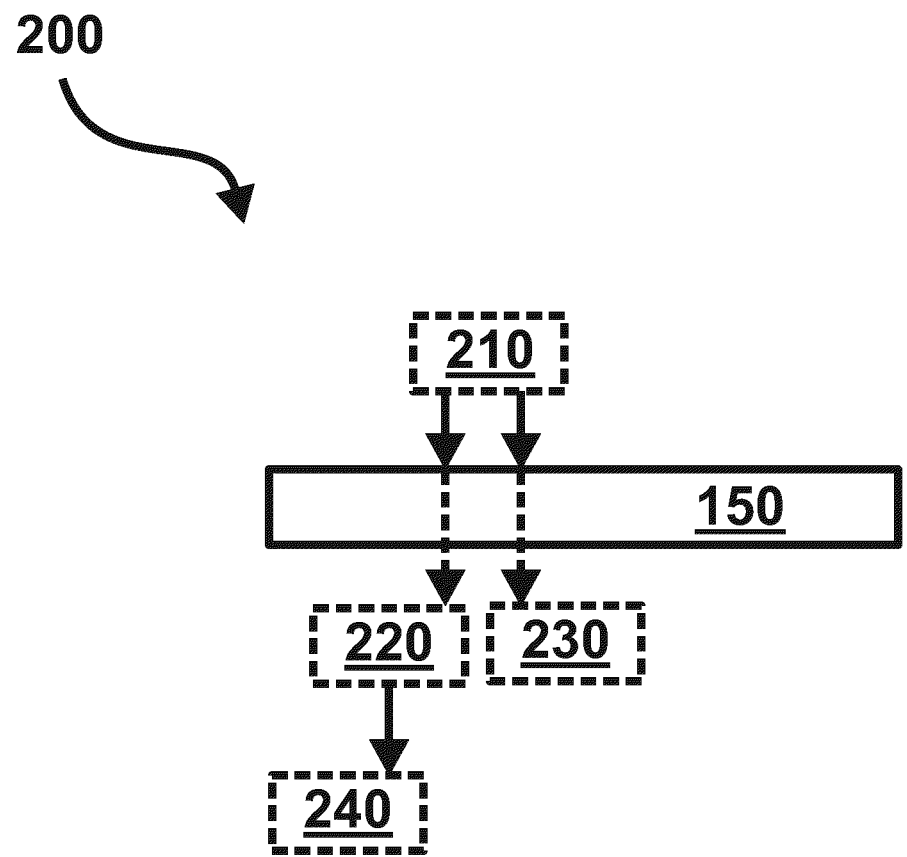
FIG. 2 shows a simplified schematic drawing of a method for copy prevention of at least one security document.

FIG. 2 shows a simplified schematic drawing of a method 200 for copy prevention of at least one security document 110. Again, for illustrative purposes the method 200 is described with reference to the neural network 150. However, this is not to be understood as limiting the method 200.

The neural network 150 may in particular be trained according to the method 100 for training the artificial intelligence based neural network 150. Accordingly, the neural network may be applicable for classifying digital images to be considered as a security document 110 or not. Since the neural network 150 is trained according to the method 100 for training, the neural network 150 is aware of the at least one security document 110 as a reference. Of course, multiple security documents 110 may be trained with the neural network 150.

Within the method 200 for copy prevention, a digital sample image 210 is provided to the neural network. The digital sample image 210 generally differs from the security document 110 provided to the neural network before. In particular, the digital sample image 210 may be altered compared to the security document 110. The alteration may show up as described before.

Then, the neural network 150 classifies this digital sample image 210 into the first category if the neural network 150 determines that a reproduction of at least a portion of the digital sample image 210 could be considered by the unbiased human observer to represent the at least one security document 110 or multiple security documents 110. In an alternative, the neural network 150 classifies this digital sample image 210 into the second category if the neural network 150 determines that for no portion of the digital sample image 210 a reproduction could be considered by the unbiased human observer to represent the at least one security document 110 or multiple security documents 110. In this regard, the neural network considers the differences between the digital sample image 210 and the security document 110. However, based on the trained decision behavior the neural network 150 may determine at least up to which acceptance level an unbiased human observer could consider a reproduction of at least a portion of the digital sample image 210 to represent the security document 110.

Moreover, the neural network prevents a reproduction of the digital sample image 210 if it is classified into the first category.

Optionally, the method 200 may be combined with a subsequentially applied authentication process preferably performed only on those digital sample images 210 which are classified into the first category, i.e. those digital sample images 210 perceivable as a security document. During the authentication process, the digital sample images of the first category may then be evaluated with regard to specific image security feature for copy prevention, such as the Eurion constellation. This subsequentially applied authentication process on the image security feature provides a cross-check whether the positive evaluation of documents perceivable as security documents in the quick AI detection method are in fact "true" positive hits comprising the respective image security documents for copy prevention. As the authentication in view of the image security feature for copy prevention requires detailed evaluation of the full security document, the authentication process is comparable time consuming Thus, although the combination of the AI detection and authentication processes appears to be more complex, the advantage also relates to overall time savings, as only a small fraction of digital sample images 210 categorized into the first category has to be authenticated in view of the image security feature for copy prevention, as the majority of digital sample images 210 may be categorized into the second category and, thus, can advantageously be omitted.

Figure 3:
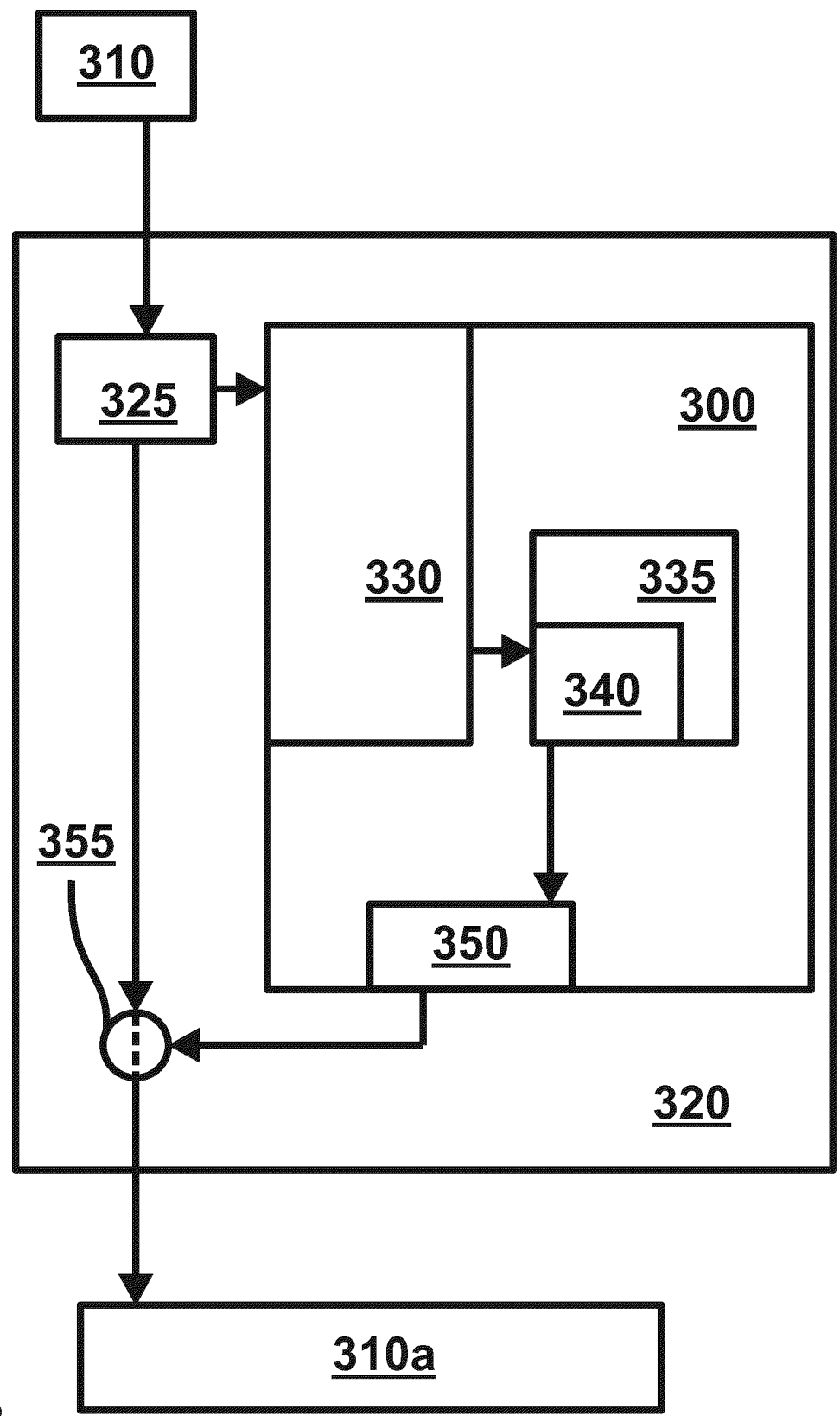
FIG. 3 shows a simplified schematic drawing of a banknote detector.

FIG. 3 shows a simplified schematic drawing of a banknote detector 300. The banknote detector 300 is software-implemented within a copying machine 320 and is configured for carrying out the method 200 for copy prevention of at least one security document.

In an exemplary scenario, a sample document 310 is provided to the copying machine 320 which is desired to be reproduced by a user of the copying machine 300. The copying machine 320 is configured to acquire a digital sample image 325 based on the sample document 310. The digital sample image 325 is provided to a communicating means 330, for example a communication interface of the banknote detector 300. The communicating means 330 is configured to provide the digital sample image 325 to a data processing unit 335. The data processing unit 335 comprises an artificial intelligence based neural network 340. The neural network 340 is configured to carry out the method for copy prevention 200 described before. The neural network 340 classifies the digital sample image 325 into a first or a second category. If the digital sample image 325 is classified into the first category, the banknote detector activates prohibiting means 350. The prohibiting means 350 are configured to interrupt the desired reproduction process at an interrupt 355. Accordingly, a reproduction of the digital sample image 325 may be avoided. If the digital sample image 325 is classified into the second category by the neural network 340, the prohibiting means 350 are not activated. Accordingly, the reproduction process is not avoided and reproductions 310a of the sample document 310 may be produced.

Figure 4:
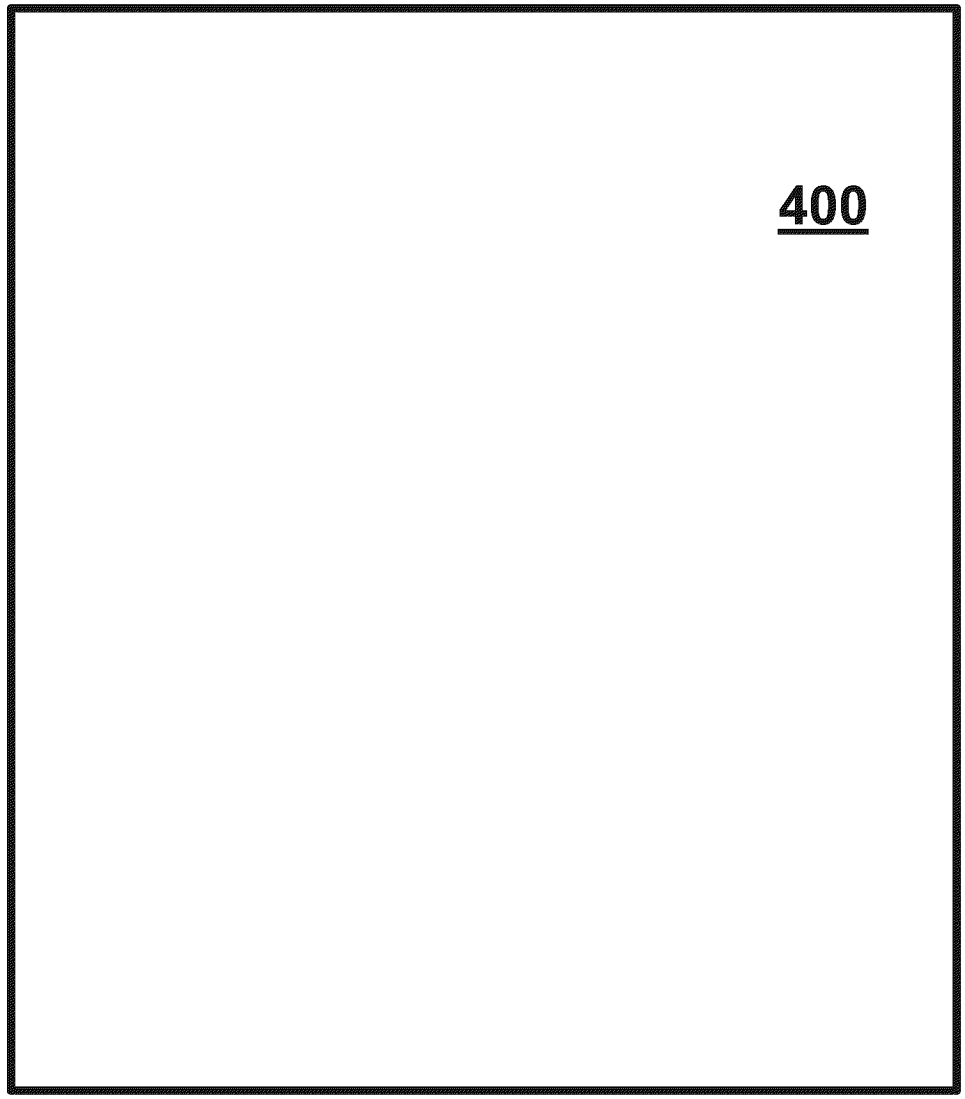
FIG. 4 shows a simplified schematic drawing of a computer program product.

FIG. 4 shows a simplified schematic drawing of a computer program product 400. The computer program product may in particular comprise or consist of instructions, which, when executed by a data processing unit cause the data processing unit to carry out steps related to classifying digital sample images. Moreover, the computer program product 400 may also comprise or consist of instructions, which when executed by the data processing unit, cause the data processing unit to prevent a reproduction of digital sample images which have been classified into the first category.

In an alternative, the data processing unit may be caused based on the contained instructions to active prohibiting means that may be arranged and configured to prevent a reproduction of digital sample images, which have been classified into the first category.

Although the invention has been described hereinabove with reference to specific embodiments, it is not limited to these embodiments and no doubt further alternatives will occur to the skilled person that lie within the scope of the invention as claimed.

Example

The training data set contained 6,000 digital images, wherein 3,000 are labeled positive (positive class considered as perceivable as security documents, namely banknotes) and 3,000 are labeled negative (negative class considered not to be perceivable as security documents, namely banknotes). 500 digital images per class are hidden for testing/evaluation purposes subsequent to the inventive training.

In this dataset, some digital images belonging to the positive class relate to true banknotes having no degradation at all (reference banknotes), some digital images have slight degradations still being considered by the labelers to belong to the positive class and others have severe degradations so that the labelers have classified them into the negative class. Only with respect to banknotes having degradations, four labelers have been used to classify the respective digital images. In the present case, a respective digital image was labeled into positive class if at least 2 labelers, i.e. 50%, labeled the image into the positive class.

The deep learning models ResNet50 with 50 layers, Inceptionv3 and DenseNet121 with 121 layers have been used.

A pre-training was conducted using the general image data set of ImageNet.

In the present example, the weights of the models are initialized to a state that performs well on the ImageNet dataset, which has become a standard to benchmark classification models. Then, the models are fine-tuned by training on the training dataset, wherein the training data set is resized to the standards of the ImageNet data set.

In this example the Adam optimizer is used, which builds on top of stochastic gradient descent, and has individual learning rates for each parameter and adjusts these according to the training progress.

In the present case, the digital images of the positive class were respectively assigned the number 1 and the digital images of the negative class were respectively assigned the number 0, respectively. The deep learning model outputs a score, which is a continuous number between 0 and 1. This score represents the likelihood of a given image to be a certain class. More specifically, the closer this score is to 0, the more likely it is for the banknote to be considered not to be perceived as a banknote by an unbiased human observer. The opposite is also true. If the score is Kopp closer to 1, it is more likely that the banknote is considered as being perceivable as a banknote by an unbiased human observer.

By default, the threshold between the two classes is defined to be 0.5. However, this threshold can be adjusted based on the precision/recall requirements. Using the default threshold, the predicted class of an image is determined by rounding down the score to 0 if it is less than or equal to the threshold, e.g. 0.5, and by rounding up the score to 1 if it is greater than the threshold, e.g. 0.5.

The following table 1 displays different parameters and their possible values, which have been used as example experiments according to the inventive training method:

TABLE 1

| Parameter | Possible Values |
|---|---|
| Architecture | ResNet50 |
| | Inceptionv3 |
| | DenseNet121 |
| Input image size | (64, 128) |
| | (128, 256) |
| | (192, 384) |
| | (256, 512) |
| | (299, 299) |
| Batch size | 8 |
| | 16 |
| | 32 |
| Learning rate | 0.005 |
| | 0.01 |
| | 0.05 |
| | 0.1 |
| Augmentations | 1. Only standard transformations |
| | a. Resize to Input Image Size |
| | b. Standardize to ImageNet mean and standard deviation |
| | 2. With augmentations |
| | a. Resize to Input Image Size |
| | b. Randomly change the brightness, contrast, saturation and hue of an image |
| | c. Apply Random affine transformation |
| | d. Blur image with randomly chosen Gaussian blur |
| | e. Standardize to ImageNet mean and standard deviation |

The present experiments revealed that the different models show similar performances for different metrics. In other words, models, which have high performance in one metric also have high performance on other metrics.

This makes selecting the "best" model easier, as there is little trade-off to consider among the metrics.

Through a search among all parameter combinations, the following set of parameters of table 2 was found to perform the best mode in the task of classification of digital images considered perceivable as banknotes or not:

TABLE 2

| Parameter | Value |
|---|---|
| Architecture | ResNet50 |
| Input image size | (64, 128) |
| Batch size | 32 |
| Learning rate | 0.005 |
| Augmentations | 1. Only standard transformations |

The confusion matrix shows 256 TN, 19 FP, 9 FN and 266 TP.

This model shows an accuracy value of 94.9% (model ranking #1), an F1 value of 95.0% (model ranking #1), an MCC value of 0.899 (model ranking #1), a recall value of 96.7% (model ranking #4), and a precision of 03.3% (model ranking #32).

The inventive training method may additionally comprise a training regarding text classifiers and/or ensembles, in particular containing only image classifiers or image and text-based classifiers.

The invention claimed is:

1. A computer-implemented method for training an artificial intelligence based neural network applicable for classifying digital images to be considered as a security document or not without authenticating a security feature, the method comprising:
    a) providing at least one digital image of at least one security document as a reference,
    b) providing a set of digital training images, wherein the digital training images are altered compared to the digital image of the security document,
        the set of digital training images comprising or consisting of a first subset of positive digital training images having a visual impact of an alteration such that an unbiased human observer would consider a reproduction of the respective digital training image to represent the security document or multiple security documents,
        the set of digital training images comprising or consisting of a second subset of negative digital training images having a visual impact of the alteration such that the unbiased human observer would not consider a reproduction of the respective digital training image to represent the security document or multiple security documents, and
    c) providing ground truth for each digital training image in step b) to the artificial intelligence based neural network, wherein the ground truth represents at least one acceptance level of one or more unbiased human observers as to whether a reproduction of the respective digital training image is to be considered representing or not representing the security document or multiple security documents.

2. The computer-implemented method of claim 1, wherein at least one altered digital training image in step b) is degraded, wherein a degradation of the digital training image is based on:
    a training document which has been chemically or physically attacked, or
    a digital image of a training document, wherein the digital image has been digitally attacked.

3. The computer-implemented method according to claim 1, wherein at least one altered digital training image in step b) differs from the digital image of the security document with regard to at least one of a resolution, a definition, a general aspect, a shape, a color, a color distribution, and an aspect ratio.

4. The computer-implemented method according to claim 1, wherein at least one altered digital training image in step b) differs from the digital image of the security document with regard to at least one of a perspective angle, an underlying illumination, a coloration, a fold, or a crease.

5. The computer-implemented method according to claim 1, wherein the security document comprises one or more graphical design features, in particular a portrait or an architectural image or a graphical image of nature, and wherein at least one digital training image in step b) differs from the digital image of the security document in that at least one design feature is substituted by a different design feature, in particular a different portrait or a different architectural image or a different image of nature.

6. The computer-implemented method according to claim 1, wherein the ground truth represents acceptance levels of at least four unbiased human observers, and wherein the ground truth comprises or consists of at least five different acceptance levels.

7. The computer-implemented method according to claim 1, wherein the security document is a banknote, wherein in step a) two digital images respectively comprising a front side image and a reverse side image of the banknote are provided, and wherein in step b) each positive digital training image has a visual impact of the alteration such that the unbiased human observer would consider a reproduction of the respective digital training image to represent the front side image and/or the reverse side image of the security document or multiple security documents.

8. The computer-implemented method according to claim 1, wherein the method is executed using a deep neural network having one or more neural layers, in particular wherein each layer exhibits independently from other layers a number of neurons and/or wherein each layer has a branched or non-branched architectural structure.

9. The computer-implemented method according to claim 1, wherein the artificial intelligence based neural network comprises machine learning capabilities.

10. The computer-implemented method according to claim 1, wherein the method is performed for a closed set of multiple security documents, wherein the artificial intelligence based neural network is trained for every security document of the closed set of security documents.

11. The computer-implemented method according to claim 1, wherein the neural network uses a residual neural network additionally utilizes skip connections and/or shortcuts to jump over at least one layer, preferably wherein the residual neural network contains 50 layers or more, or uses an inception network that combines convolutions with different kernel sizes, preferably two convolutions with 3x3 kernels, or uses a DenseNet using Dense Blocks, wherein each layer receives inputs from all preceding layers, preferably a DenseNet with 121 layers.

12. The computer-implemented method according to claim 11, wherein a general image dataset is further provided and prior to training the neural network with the digital images of step a) and step b) the neural network is pre-trained with the large general image data set.

13. The computer-implemented method according to claim 11, wherein the digital images of step a) and step b) are provided with the same standardized size, preferably wherein in case of a pre-training the digital images of step a) and step b) are provided with the same standardized size as the image data used for the pre-training.

14. The computer-implemented method according to claim 1, wherein the method uses a batch size of 8 or more, 16 or more, or 32 or more digital images in total of step a) and step b).

15. The computer-implemented method according to claim 1, wherein the method uses a learning rate of one of 0.005, 0.01, 0.5, or 0.1, preferably 0.005.

16. The computer-implemented method according to claim 1, wherein the method uses ensembling of the image classifiers of step b).

17. The computer-implemented method according to claim 1, wherein the method additionally uses one or more text classifiers.

18. The computer-implemented method according to claim 17, wherein the method uses ensembling of the one or more text classifiers.

19. A computer-implemented method for copy prevention of at least one security document without authenticating a security feature, comprising:
  d) providing a digital sample image,
  e) applying an artificial intelligence based neural network for classifying the digital sample image into a first category or a second category, wherein the neural network is trained according to the method of claim 1, wherein the digital sample image is classified into the first category if the neural network determines that a reproduction of at least a portion of the digital sample image could be considered by the unbiased human observer to represent the at least one security document or multiple security documents,
    wherein the digital sample image is classified into the second category if the neural network determines that for no portion of the digital sample image a reproduction could be considered by the unbiased human observer to represent the at least one security document or multiple security documents, and
  f) preventing the digital sample image from being reproduced if the neural network classifies the digital sample image into the first category.

20. The computer-implemented method of claim 19, wherein the digital sample image is altered compared to the digital image of the security document, wherein the altered digital sample image differs from the digital image of the security document with regard to at least one of a perspective angle, an underlying illumination, a coloration, a fold, or a crease.

21. The computer-implemented method according to claim 19, wherein the security document comprises or more graphical design features, in particular a portrait or an architectural image or a graphical image of nature, and wherein the digital sample image differs from the digital image of the security document in that at least one design feature is substituted by a different design feature, in particular a different portrait or a different architectural image or a different graphical image of nature.

22. The computer-implemented method according to claim 19, wherein the security document comprises a front side and a reverse side, and wherein the digital sample image is classified into the first category in step b) if the neural network determines that a reproduction of at least a portion of the digital sample image could be considered by the unbiased human observer to represent the front side and/or the reverse side of the security document or multiple security documents, wherein the digital sample image is classified into the second category in step b) if the neural network determines that for no portion of the digital sample image a reproduction could be considered by the unbiased human observer to represent the front side and/or the reverse side of the security document or multiple security documents.

23. The computer-implemented method according to claim 19, wherein in step b) the ground truth represents a range of acceptance levels comprising or consisting of a first subrange and a second subrange,
  wherein in step b) a digital sample image is classified into the first category if the neural network determines an acceptance level according to the first subrange that the reproduction of at least a portion of the digital sample image could be considered by the unbiased human observer to represent the at least one security document or multiple security documents, wherein in step b) a digital sample image is classified into the second category if the neural network determines an acceptance level according to the second subrange that for no portion of the digital sample image a reproduction could be considered by the unbiased human observer to represent the at least one security document or multiple security documents, and wherein the first subrange is larger than the second subrange.

24. A banknote detector comprising a communications unit and a data processor, wherein the communications unit is configured to receive a digital sample image and to provide the digital sample image to the data processor, wherein the data processor is configured for carrying out the method of claim 19, and wherein the banknote detector is configured to prevent a reproduction of the digital sample image.

25. A banknote detector according to claim 24, wherein the banknote detector is software-implemented, and wherein the banknote detector is comprised within a device for reproducing the digital sample image, or wherein the banknote detector is configured as a cloud-based or server-based application.

26. The banknote detector according to claim 24, wherein the banknote detector is further configured to evaluate the digital sample image with regard to authenticity if the digital sample image is classified into the first category in step b), wherein the digital sample image is evaluated with regard to at least one security feature included in the at least one security document.

27. The banknote detector according to claim 26, wherein the digital sample image is authenticated with regard to at least one image security feature for copy prevention included in the at least one security document.

28. A computer program product comprising instructions on a non-transitory readable medium which, when the program is executed by a data processing unit, cause the data processing unit to carry out step b) of claim 19.

\* \* \* \* \*